(12) United States Patent
Kabuto

(10) Patent No.: US 11,503,249 B2
(45) Date of Patent: Nov. 15, 2022

(54) RELAY DEVICE, RECEIVING DEVICE, AND TRANSMISSION SYSTEM USING SAME

(71) Applicant: Maxell, Ltd., Kyoto (JP)

(72) Inventor: Nobuaki Kabuto, Tokyo (JP)

(73) Assignee: MAXELL, LTD., Kyoto (JP)

(*) Notice: Subject to any disclaimer, the term of this patent is extended or adjusted under 35 U.S.C. 154(b) by 324 days.

(21) Appl. No.: 16/652,683

(22) PCT Filed: Sep. 27, 2018

(86) PCT No.: PCT/JP2018/035926
§ 371 (c)(1),
(2) Date: Apr. 1, 2020

(87) PCT Pub. No.: WO2019/069785
PCT Pub. Date: Apr. 11, 2019

(65) Prior Publication Data
US 2020/0244923 A1    Jul. 30, 2020

(30) Foreign Application Priority Data
Oct. 6, 2017    (JP) .............................. JP2017-196332

(51) Int. Cl.
*G06F 13/38*    (2006.01)
*G06F 13/40*    (2006.01)
(Continued)

(52) U.S. Cl.
CPC ........... *H04N 7/104* (2013.01); *G06F 13/382* (2013.01); *G06F 13/4072* (2013.01);
(Continued)

(58) Field of Classification Search
CPC ...... H04N 7/104; H04N 7/0125; H04N 7/102; H04N 21/43635; H04N 21/615;
(Continued)

(56) References Cited

U.S. PATENT DOCUMENTS 10,317,969 B1 *    6/2019    Bodnaruk ............. G06F 13/385
11,094,488 B2 *    8/2021    Ando ..................... H01H 47/00
(Continued)

OTHER PUBLICATIONS

"HDMI Over USB Type-C" USB Developer Days 2016 data, Oct. 19, 2016, p. 21-27 <URL:http://www.usb.org/developers/presentations/USB_DevDays_Hong_Kong_2016_-_HDMI_Alt_Mode_USB_Type-C.pdf>.
(Continued)

*Primary Examiner* — Paulos M Natnael
(74) *Attorney, Agent, or Firm* — Mattingly & Malur, PC

(57) ABSTRACT

There is a problem that video data cannot be relayed from a transmission device having an HDMI connector to a receiving device having a USB Type-C connector. In order to solve the above problem, each of a receiving device having an HDMI reception function unit and a relay device, such as a conversion cable for relaying video data from a transmission device, is made to have a function of determining the other devices. By performing switching of a terminator or a protection element between valid and invalid or performing signal connection switching based on the determination result of the function unit, the above problem can be solved. In addition, it is also possible to realize reverse insertion connection for reversing the video data transmission direction of the relay device.

5 Claims, 11 Drawing Sheets

(51) Int. Cl.
*H04N 7/10* (2006.01)
*H04N 7/01* (2006.01)

(52) U.S. Cl.
CPC ... *H04N 7/0125* (2013.01); *G06F 2213/0042* (2013.01); *G06F 2213/3852* (2013.01)

(58) Field of Classification Search
CPC .............. G06F 13/382; G06F 13/4072; G06F 2213/0042; G06F 2213/3852; G06F 13/38
See application file for complete search history.

(56) References Cited

U.S. PATENT DOCUMENTS

| | | | |
|---|---|---|---|
| 2017/0102736 A1 | 4/2017 | Peng et al. | |
| 2017/0109311 A1* | 4/2017 | Gerber | G06F 13/4068 |
| 2017/0192923 A1 | 7/2017 | Liu | |
| 2017/0373882 A1 | 12/2017 | Doi et al. | |
| 2018/0239732 A1* | 8/2018 | Yang | G06F 13/4022 |
| 2018/0323563 A1* | 11/2018 | Xu | H01R 13/6616 |
| 2019/0075338 A1* | 3/2019 | Liao | H04N 21/2368 |
| 2019/0082141 A1* | 3/2019 | Chen | G06F 13/4282 |
| 2020/0012614 A1* | 1/2020 | Lin | H04L 5/16 |
| 2020/0175941 A1* | 6/2020 | Chan | G09G 5/006 |

OTHER PUBLICATIONS

"Universal Serial Bus Type-C Cable and Connector Specification", Release 1.3, USB 3.0 Promoter Group, Jul. 14, 2017, p. 1-6, 14-27, 130-182, 203-210, <URL:https://usb.org/sites/default/files/documents/usb_type-c.zip>.

International Search Report of PCT/JP2018/035926 dated Oct. 30, 2018.

* cited by examiner

| Source | | Cable Assembly | |
|---|---|---|---|
| Internal HDMI | USB Type C Receptacle | USB Type C Plug | HDMI Plug |
| HPD | B8 / A8 | B8 | HPD |
| Utility | A8 / B8 | A8 | Utility |
| CLK+ | B3 / A3 | B3 | CLK+ |
| CLK− | B2 / A2 | B2 | CLK− |
| D0+ | A10 / B10 | A10 | D0+ |
| D0− | A11 / B11 | A11 | D0− |
| D1+ | A2 / B2 | A2 | D1+ |
| D1− | A3 / B3 | A3 | D1− |
| D2+ | B11 / A11 | B11 | D2+ |
| D2− | B10 / A10 | B10 | D2− |

| Cable Assembly || Sink ||
|---|---|---|---|
| HDMI Plug | USB Type C Plug | USB Type C Receptacle | Internal HDMI |
| HPD | B8 | B8 / A8 | HPD |
| Utility | A8 | A8 / B8 | Utility |
| CLK+ | A10 | A10 / B10 | CLK+ |
| CLK− | A11 | A11 / B11 | CLK− |
| D0+ | B3 | B3 / A3 | D0+ |
| D0− | B2 | B2 / A2 | D0− |
| D1+ | B11 | B11 / A11 | D1+ |
| D1− | B10 | B10 / A10 | D1− |
| D2+ | A2 | A2 / B2 | D2+ |
| D2− | A3 | A3 / B3 | D2− |

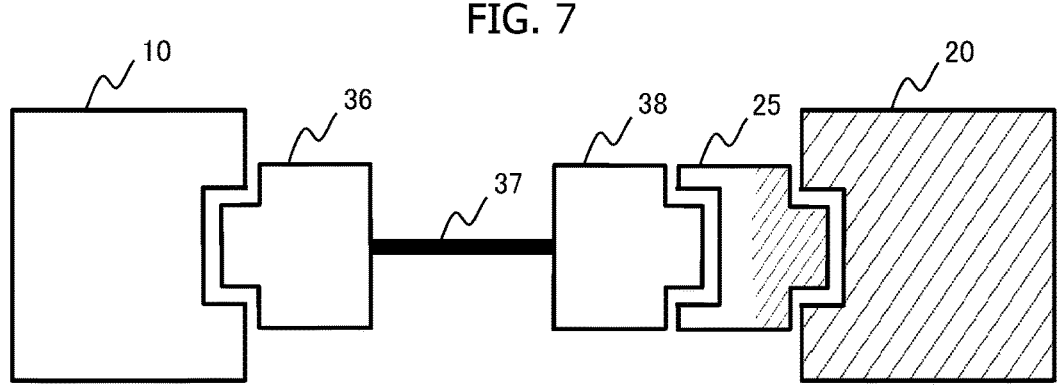

FIG. 8

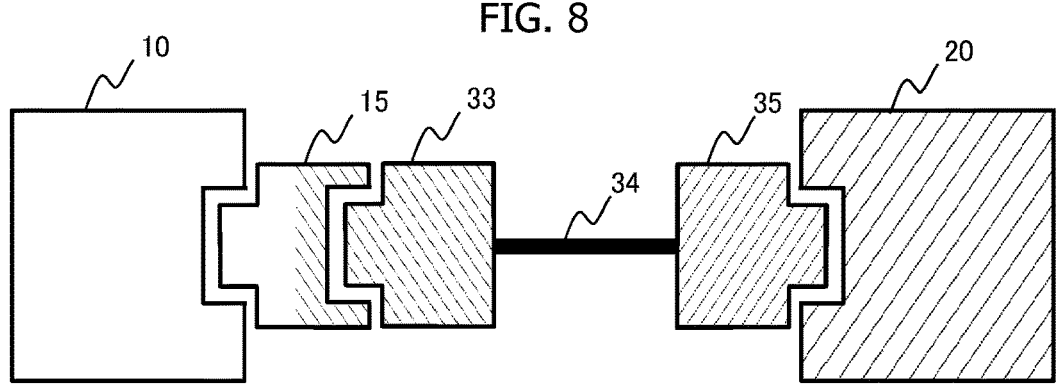

FIG. 9

| Source | | Dongle | | Cable Assembly | | Sink | |
|---|---|---|---|---|---|---|---|
| Internal HDMI | HDMI Receptacle | HDMI Plug | USB Type C Receptacle | USB Type C Plug | USB Type C Plug | USB Type C Receptacle | Internal HDMI |
| HPD | HPD | HPD | B8 | B8 | B8 | B8 / A8 | HPD |
| Utility | Utility | Utility | A8 | A8 | A8 | A8 / B8 | Utility |
| CLK+ | CLK+ | CLK+ | B3 | B3 | A10 | A10 / B10 | CLK+ |
| CLK− | CLK− | CLK− | B2 | B2 | A11 | A11 / B11 | CLK− |
| D0+ | D0+ | D0+ | A10 | A10 | B3 | B3 / A3 | D0+ |
| D0− | D0− | D0− | A11 | A11 | B2 | B2 / A2 | D0− |
| D1+ | D1+ | D1+ | A2 | A2 | B11 | B11 / A11 | D1+ |
| D1− | D1− | D1− | A3 | A3 | B10 | B10 / A10 | D1− |
| D2+ | D2+ | D2+ | B11 | B11 | A2 | A2 / B2 | D2+ |
| D2− | D2− | D2− | B10 | B10 | A3 | A3 / B3 | D2− |

903  904  914

| Cable Assembly | | Sink | |
|---|---|---|---|
| HDMI Plug | USB Type C Plug | USB Tyoe C Receptacle | Internal HDMI |
| HPD | B8 | B8 / A8 | HPD |
| Utility | A8 | A8 / B8 | Utility |
| CLK+ | B3 | B3 / A3 | CLK+ |
| CLK− | B2 | B2 / A2 | CLK− |
| D0+ | A10 | A10 / B10 | D0+ |
| D0− | A11 | A11 / B11 | D0− |
| D1+ | A2 | A2 / B2 | D1+ |
| D1− | A3 | A3 / B3 | D1− |
| D2+ | B11 | B11 / A11 | D2+ |
| D2− | B10 | B10 / A10 | D2− |

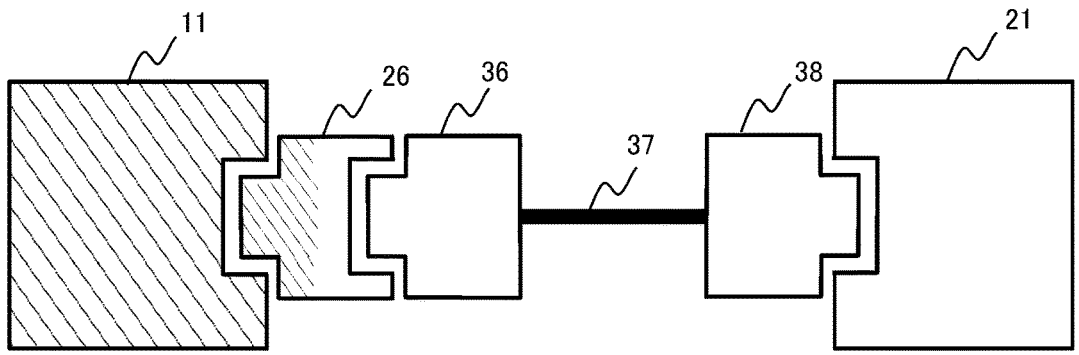

FIG. 14

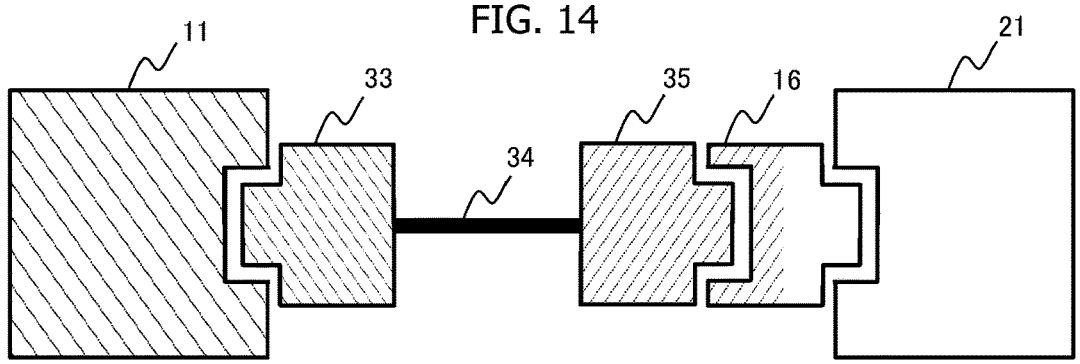

FIG. 15

| Source | | Cable Assembly | | Dongle | | Sink | |
|---|---|---|---|---|---|---|---|
| Internal | USB Type C | USB Type C | USB Type C | USB Type C | HDMI | HDMI | Internal |
| HDMI | Receptacle | Plug | Plug | Receptacle | Plug | Receptacle | HDMI |
| HPD | B8 / A8 | B8 | B8 | B8 | HPD | HPD | HPD |
| Utility | A8 / B8 | A8 | A8 | A8 | Utility | Utility | Utility |
| CLK+ | B3 / A3 | B3 | A10 | A10 | CLK+ | CLK+ | CLK+ |
| CLK− | B2 / A2 | B2 | A11 | A11 | CLK− | CLK− | CLK− |
| D0+ | A10 / B10 | A10 | B3 | B3 | D0+ | D0+ | D0+ |
| D0− | A11 / B11 | A11 | B2 | B2 | D0− | D0− | D0− |
| D1+ | A2 / B2 | A2 | B11 | B11 | D1+ | D1+ | D1+ |
| D1− | A3 / B3 | A3 | B10 | B10 | D1− | D1− | D1− |
| D2+ | B11 / A11 | B11 | A2 | A2 | D2+ | D2+ | D2+ |
| D2− | B10 / A10 | B10 | A3 | A3 | D2− | D2− | D2− |

906  907

RELAY DEVICE, RECEIVING DEVICE, AND TRANSMISSION SYSTEM USING SAME

TECHNICAL FIELD

The present invention relates to a video signal relay device, a receiving device, and a transmission system using the same.

BACKGROUND ART

A universal serial bus (USB) that is one of the serial bus standards for connecting peripheral device to an information device, such as computer, is known. As a connector standard established in the USB standard "USB 3.1", there is USB Type-C.

The USB Type-C connector has a feature that the insertion port is reversible and can be inserted in any of up and down directions and accordingly, the same USB Type-C connector can be used on both the host side and the device side.

As a background art of this technical field, there are Patent Document 1 and Non-Patent Document 1. Patent Document 1 describes that a mobile device provides power and video data to a projector through a USB interface. In addition, Non-Patent Document 1 describes a configuration example of a cable assembly for video transmission from a USB type-C interface of video transmission device to a high-definition multimedia interface (HDMI) (registered trademark) terminal of a video receiving device.

CITATION LIST

Patent Document

Patent Document 1: US 2017/0,102,736 A

Non-Patent Document

Non-Patent Document 1: "HDMI Over USB type-C" USB Developer Days 2016 data, Oct. 19, 2016, p. 21-27 (URL: http://www.usb.org/developers/presentations/USB_DevDays_Hong_Kong_2016_-_HDMI_Alt_Mode_USB_Type-C.pdf)

SUMMARY OF THE INVENTION

Problems to be Solved by the Invention

Patent Document 1 does not describe and does not consider a method of transmitting video data to video device having an HDMI terminal through a USB type-C interface.

In addition, Non-Patent Document 1 does not describe and does not consider video transmission from an HDMI terminal of a video transmission device to a USB type-C interface of a video receiving device.

The present invention has been made in view of these problems, and an object thereof is to provide a relay device capable of transmitting video data between a video device having an HDMI terminal and a video device having a USB type-C interface, a receiving device, and a transmission system using the same.

Solutions to Problems

The present invention has been made in view of the above background art and problems, and an example thereof is a relay device for relaying a video. The relay device includes: an input unit to which a video from a transmission device is input; an output unit that outputs a video to a receiving device; a DC blocking element that connects pin 1 of the input unit and pin 2 of the output unit to each other; a terminator that is connected to the pin 1; a protection element that pulls down pin 3 of the input unit and pin 4 of the output unit; a control unit to which pin 5 of the input unit and pin 6 of the output unit are connected; and pin 7 of the input unit that is connected to the control unit. The control unit determines that the receiving device has a predetermined reception function based on information obtained from the pin 6 and, when a predetermined voltage is detected at the pin 7, separates the protection element from the pin 4 and applies a predetermined voltage to the terminator. When a standby state of the receiving device detected from the pin 4, the control unit starts supply of termination power to the terminator to transmit video data from the pin 1 to the pin 2.

Effects of the Invention

According to the present invention, it is possible to provide a relay device capable of transmitting video data between a video device having an HDMI terminal and a video device having a USB type-C interface, a receiving device, and a transmission system using the same.

BRIEF DESCRIPTION OF THE DRAWINGS

FIG. 3 is an explanatory diagram illustrating terminal connections between a conversion cable and a receiving device according to Embodiment 1.

FIG. 7 is a diagram illustrating an example of connecting a transmission device and a receiving device to each other with a cable and a conversion dongle in Embodiment 2.

FIG. 8 is a diagram illustrating an example of connecting a transmission device and a receiving device to each other with a conversion dongle and a cable in Embodiment 3.

FIG. 9 is an explanatory diagram illustrating terminal connections of a transmission device, a conversion dongle, a cable, and a receiving device according to Embodiment 3.

FIG. 13 is a diagram illustrating an example of connecting a transmission device and a receiving device to each other with a conversion dongle and a cable in Embodiment 5.

FIG. 14 is a diagram illustrating an example of connecting a transmission device and a receiving device to each other with a cable and a conversion dongle in Embodiment 6.

FIG. 15 is an explanatory diagram illustrating terminal connections of a transmission device, a conversion dongle, a cable, and a receiving device according to Embodiment 6.

MODE FOR CARRYING OUT THE INVENTION

Hereinafter, embodiments will be described with reference to the diagrams.

Embodiment 1

Figures 1, 2:
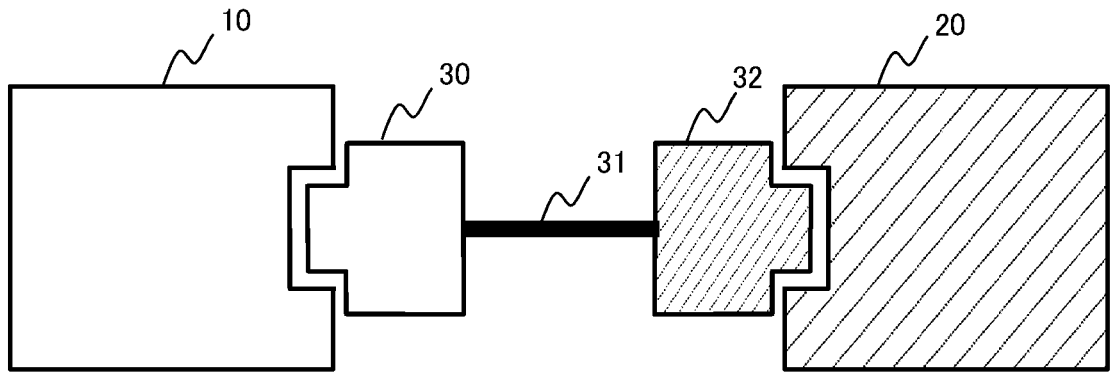
FIG. 1 is a diagram illustrating an example of connecting a transmission device and a receiving device to each other with a conversion cable in Embodiment 1.
FIG. 2 is an explanatory diagram illustrating terminal connections between a transmission device and a conversion cable in the related art.

FIG. 1 is a block diagram in which a transmission device and a receiving device according to the present embodiment are connected to each other by a conversion cable.

In FIG. 1, a transmission device 10 having an HDMI receptacle and a receiving device 20 having a USB Type-C (hereinafter, abbreviated as USB-C) receptacle are connected to each other by an H-C conversion cable configured by an HDMI plug 30, a cable 31, and a USB-C plug 32. The H-C conversion cable is a relay device, and determines that the receiving device 20 has a reception function corresponding to the present embodiment and transmits an HDMI video signal transmitted from a transmission device to a receiving device through a USB-C plug.

FIG. 2 is an explanatory diagram illustrating terminal connections between a transmission device and a conversion cable disclosed in Non-Patent Document 1. An HDMI-format video signal (Internal HDMI) formed by a video source inside the transmission device is output to a USB-C receptacle (USB Type C Receptacle) and transmitted to a USB-C plug (USB Type C Plug) of a C-H conversion cable (Cable Assembly). The C-H conversion cable outputs this video signal to an HDMI Plug and transmits the video signal to an HDMI receptacle (not illustrated) of the receiving device.

The transmission device has a function of determining the front and back of a plug and switching and outputting each signal to one of two terminals so that the USB-C can be inserted into the receptacle in any direction of the front and back of the plug. For example, a hot plug detect (HPD) signal is switched and output to Pin B8 if the plug is front, and is switched and output to Pin A8 if the plug is back.

FIG. 3 is an explanatory diagram illustrating terminal connections between the H-C conversion cable and the receiving device in the present embodiment. The H-C conversion cable receives a video signal output from the HDMI receptacle of the transmission device 10 at the HDMI plug 30 and outputs the video signal to the USB-C plug 32.

The receiving device 20 has a function of determining the front and back of the USB-C plug 32 and selecting the signal of two terminals so that a suitable signal is input to an internal HDMI receiving unit when the output of the USB-C plug 32 is received at the USB-C receptacle.

The terminal connection of the H-C conversion cable illustrated in FIG. 3 is a terminal connection in consideration of a case where the H-C conversion cable is configured by a conversion dongle and a USB-C normal cable. For this reason, this is different from the terminal connection in the C-H conversion cable of FIG. 2 (referring to a broken line frame 901 and a solid line frame 902, the connection destination of CLK+ is B3 and A10, which are different), and details of this connection will be described in Embodiment 3.

Figure 4:
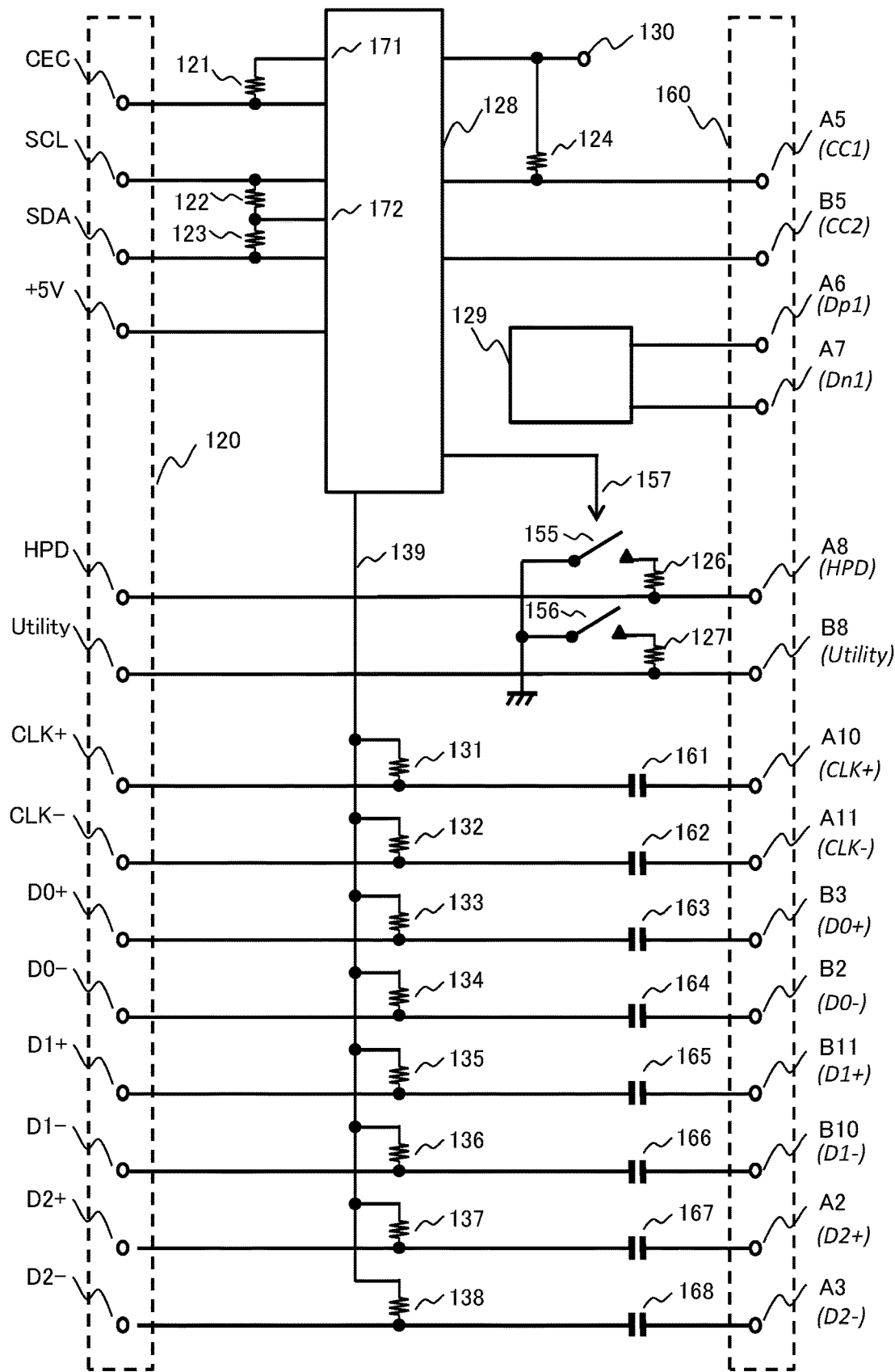
FIG. 4 is a block diagram illustrating a configuration example of a conversion cable according to Embodiment 1.

FIG. 4 is a block diagram illustrating a configuration example of the H-C conversion cable according to the present embodiment. FIG. 4, an input unit 120 is a terminal in the HDMI plug 30, and is configured to include CEC, SCL, SDA, +5V, HPD, Utility, CLK+, CLK−, D0+, D0−, D1+, D1−, D2+, and D2−. An output unit 160 is a terminal in the USB-C plug 32, and is configured to include A5, B5, A6, A7, A8, B8, A10, A11, B3, B2, B11, B10, A2, and A3. Below each terminal symbol, the name of each signal is described in italics in parentheses. 128 is a control unit, 129 is a USB2 function unit, 130 is a power supply terminal, 121, 122, 123, and 124 are pull-up elements such as resistors, 126 and 127 are protection elements such as resistors, 155 and 156 are switches, 131 to 138 are terminators such as resistors, and 161 to 168 are DC blocking elements such as capacitors.

Figure 5:
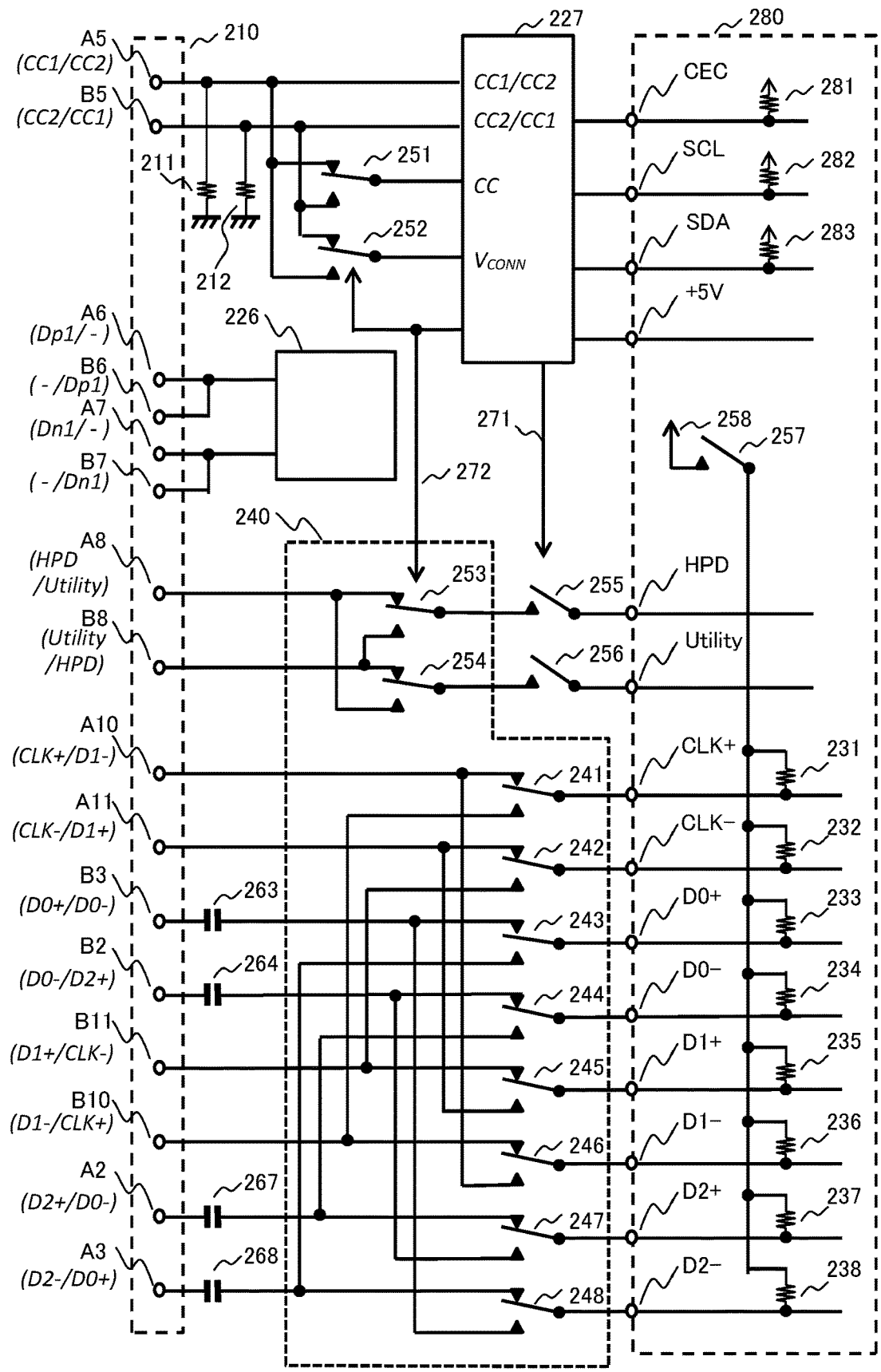
FIG. 5 is a block diagram illustrating a configuration example of the receiving device according to Embodiment 1.

FIG. 5 is a block diagram illustrating a configuration example of the receiving device according to the present embodiment. In FIG. 5, an input unit 210 is a terminal in the USB-C receptacle of the receiving device, and is configured to include A5, B5, A6, B6, A7, B7, A8, B8, A10, A11, B3, B2, B11, B10, A2, and A3. The input of an HDMI reception function unit 280 is configured to include CEC, SCL, SDA, +5V, HPD, Utility, CLK+, CLK−, D0+, D0−, D1+, D1−, D2+, and D2−. 211 and 212 are pull-down elements such as resistors, 281, 282, and 283 are pull-up elements such as resistors, 231 to 238 are terminators such as resistors, 255, 256, and 257 are switches, and 258 is a terminating power supply. 227 is a control unit, 226 is a USB2 function unit, 263, 264, 267, and 268 are DC blocking elements such as capacitors. Reference numerals 241 to 248, 251, 252, 253, and 254 are selector switches.

Hereinafter, the operation of the present embodiment will be described with reference to FIGS. 4 and 5.

The control unit 227 illustrated in FIG. 5 is connected to the control unit 128 illustrated in FIG. 4 through the terminals A5 and B5 of the input unit 210 and the terminals A5 and B5 of the output unit 160 illustrated in FIG. 4, and establishes a communication channel according to a procedure defined in the USB Type-C specification.

The terminal A5 and the terminal B5 of the input unit 210 are pulled down to GND by the 5.1 kΩ pull-down elements 211 and 212, and the A5 terminal of the output unit 160 is connected to the +5V power supply terminal 130 by the 56 kΩ pull-up element 124. Therefore, the receiving device illustrated in FIG. 5 is treated as Sink on a side where a video signal is received, the input unit 210 is treated as an upstream facing port (UFP), the relay device illustrated in FIG. 4 is treated as a Source on a side where a video signal is output, and the output unit 160 is treated as a downstream facing port (DFP).

The B5 terminal of the output unit 160 is opened or pulled down in the control unit 128 until the output unit 160 is treated as DFP, so that the A5 terminal and the B5 terminal of the output unit 160 illustrated in FIG. 4 are 0.4 V and 0 V, respectively. The control unit 227 illustrated in FIG. 5 determines that the front of the plug is inserted when 0.4 V is detected at the terminal A5 of the input unit 210 and that the back of the plug is inserted when 0.4 V is detected at the terminal 135. Based on this determination result 272, the switches 251 and 252 are switched in addition to the switches 241 to 248, 253, and 254 in a switching unit 240 of the broken line frame. In the case of front insertion determination, upper selection illustrated in the diagram is performed. In the case of back insertion determination, lower selection opposite to that illustrated in the diagram is performed.

As a result, the HDMI signal HPD, Utility, CLK+, CLK−, D0+, D0−, D1+, D1−, D2+, and D2− input to the input unit 120 of the H-C conversion cable illustrated in FIG. 4 are transmitted to the HDMI reception function unit 280 of the receiving device illustrated in FIG. 5. A DDC signal and a CEC signal transmitted through the SCL and the SDA are converted into a CC communication protocol of USB-C by the control unit 128, restored to the DDC signal and the CEC signal by the control unit 227, and transmitted to the HDMI reception function unit 280.

In addition, in FIG. 5, signal switching based on the front and back determination regarding the plug is performed in the state of differential signal before the HDMI reception function unit 280, but may be performed after serial transmission and decoding in the HDMI reception function unit 280. In this case, as shown in parentheses below each terminal symbol of the input unit 210, for some signals having opposite polarities, the signals may be inverted (1's complement processing for parallel signals).

The terminal CEC of the input unit 120 is connected to a 3.3V terminating power supply 171 through the 27 kΩ pull-up element 121, and the terminals SCL and SDA are connected to a 5V terminating power supply 172 through the 47 kΩ pull-up elements 122 and 123. The terminating power supplies 171 and 172 may supply power after power is supplied to the terminal +5V of the power supply terminal 130.

Since the HDMI video signal is DC-coupled, the DC blocking elements 161 to 168 are inserted into the H-C conversion cable illustrated in FIG. 4 according to the USB-C data transmission protection standard that requires AC coupling. In addition, the terminators 131 to 138 necessary for transmitting the HDMI video signal are connected to a terminating power supply 139. Each terminator has a resistance of, for example, 50Ω, and the control unit 227 checks the HDMI reception capability of the receiving device 20 and supplies 3.3 V to the terminating power supply 139 after checking that +5 V is supplied from the transmission device 10.

The terminals A8 and B8 of the output unit 160 for transmitting HPD and Utility signals are pulled down to GND by the protection elements 126 and 127 until the control unit 227 can check the HDMI reception capability of the receiving device 20, thereby protecting the USB-C element. Better the control unit checks the HDMI reception capability, the switches 155 and 156 are turned off according to a check result 157, the pull-down is stopped to transmit the HPD and Utility signals.

By inserting the DC blocking elements 263, 264, 267, and 268 in the terminals B3, B2, A2, and A3 of the input unit 210 illustrated in FIG. 5, other USB-C devices can be prevented from being damaged even in a case where a normal USB-C cable is incorrectly plugged in.

The 50Ω terminators 231 to 238 for impedance matching are provided in the HDMI reception function unit 280 illustrated in FIG. 5. The control unit 227 checks from the information obtained at the terminal A5 or the terminal B5 of the input unit 210 that the relay device has a function of transmitting an HDMI video signal, and then turns on the switch 257 between the 3.3V terminating power supply 258 and these terminators so that TMDS signals of CLK+, CLK−, D0+, D0−, D1+, D1−, D2+, and D2− can be received. In addition, since the 50Ω terminator 131 and others in the H-C conversion cable illustrated in FIG. 4 and the 50Ω terminator 231 and others in the HDMI reception function unit 280 illustrated in FIG. 5 are provided in parallel, the termination impedance for the AC component is apparently halved compared with a case where the HDMI transmission device and the HDMI receiving device are connected to each other by an HDMI cable without termination of 50Ω. For this reason, the signal amplitude may be half that of the normal HDMI signal. Therefore, the HDMI reception function unit 280 may be made to have a reception sensitivity corresponding to half of the normal HDMI signal or have a double amplification function by switching the input gain.

Figure 6:
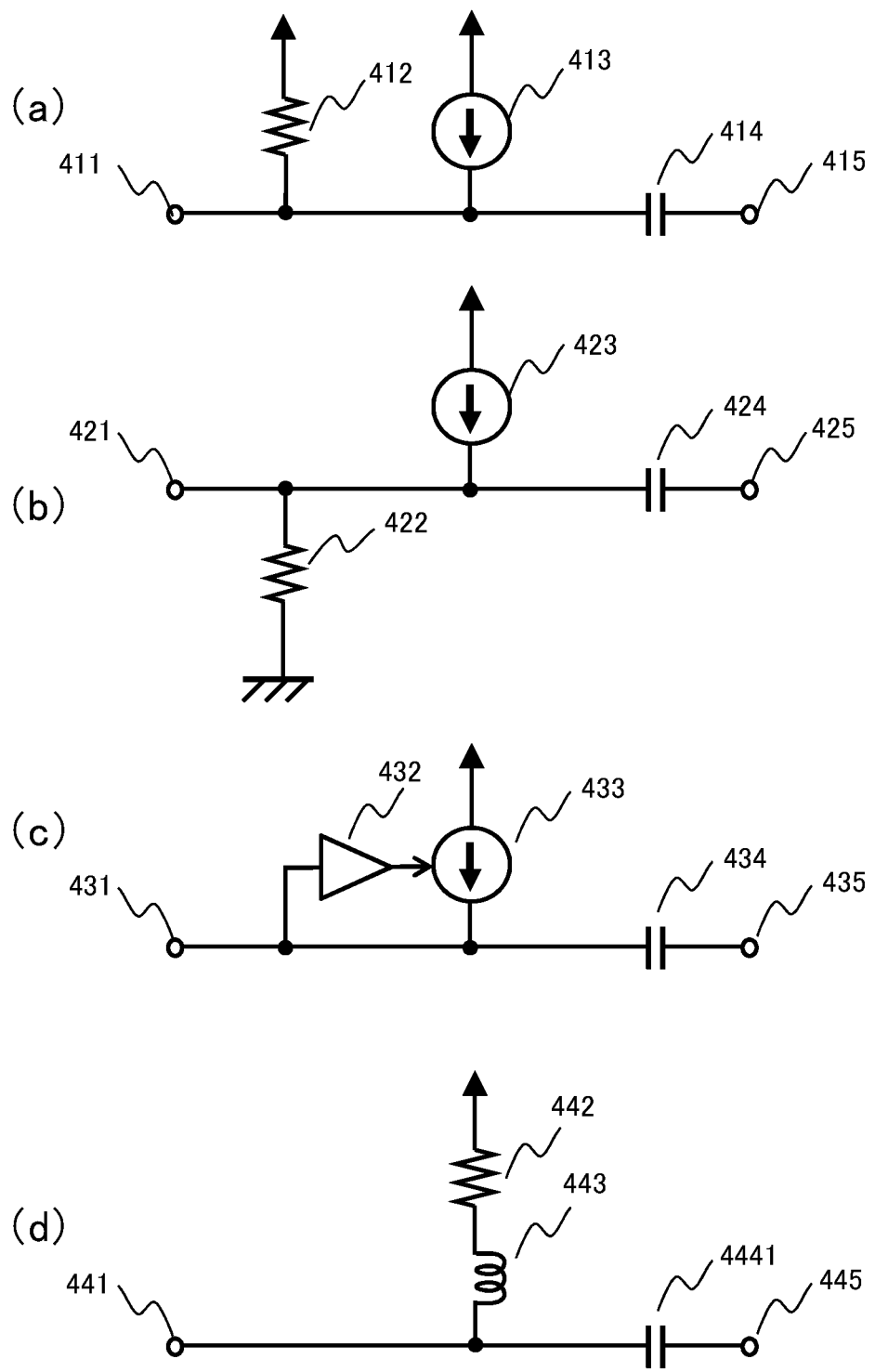
FIG. 6 is a circuit diagram illustrating a configuration example of a terminator according to Embodiment 1.

FIG. 6 illustrates another configuration example of the terminator 131 in the H-C conversion cable illustrated in FIG. 4. These are configuration examples in which a decrease in signal amplitude due to the impedance of a terminator can be suppressed.

In (a) of FIG. 6, a constant current element 413 of 5 mA or less, which is about half of 10 mA of a constant current source in a transmission device specified by HDMI, and a resistor element 412 of, for example, about 1 kΩ are connected to a terminating power supply. Assuming that the constant current source in the transmission device has a variation of about 12 mA to 8 mA, the constant current element 413 needs to be set to about 4 mA, which is half of the lower limit 8 mA, and about 2 mA, which is half of the difference 4 mA between the upper limit 12 mA and the lower limit 8 mA, needs to be supplied from the resistor element 412. Since a voltage drop of 700 mV is allowed according to the HDMI output specification, the upper limit of the resistor element 412 is 350Ω. Since the resistor element 412 affects the transmission impedance, an inductor (not illustrated) may be inserted in series after setting the resistor element 412 to about 350Ω.

FIG. 6(b) is an example in which a constant current element 423 of 5 mA or more, which is about half of 10 mA of a constant current source in a transmission device, is connected to terminating power supply and a resistor element 422 of, for example, about 2 kΩ is connected to GND. Assuming that the constant current source in the transmission device has a variation of about 12 mA to 8 mA, the constant current element 423 needs to be set to about 6 mA, which is half of the upper limit 12 mA, and about 2 mA, which is half of the difference 4 mA between the upper limit 12 mA and the lower limit 8 mA, needs to be extracted from the resistor element 422. In the HDMI output specification, when the terminating power supply is set to 3.3 V, voltage drop of 700 mV is allowed, so that the potential between both ends of the resistor element 422 is 2.6 V. Therefore, the resistance of the resistor element 422 is about 1.3 kΩ as 2.6 V/2 mA. Since the resistor element 422 affects the transmission impedance, an inductor (not illustrated) may be inserted in series after setting the resistor element 422 to about 1.3 kΩ.

In addition, although (a) illustrates an example in which the resistor element 412 is connected to a terminating power supply (for example, 3.3 V) and (b) illustrates an example in which the resistor element 422 is connected to GND, connection to the average voltage (3.05 V) of HDMI output may be made. In this case, assuming that the constant current element is 5 mA, in order to absorb a difference 1 mA from half 6 mA of the upper limit current 12 mA by the resistor element, (700 mV−250 mV)/1 mA=450Ω is required. In order to absorb a difference 1 mA from half 4 mA of the lower limit current 8 mA by the resistor element, 250 mV/1 mA=250Ω is required. Since both resistance values are maximum values, about 250Ω is desirable. In consideration of impedance matching, an inductor may be provided in series with the resistor element.

In FIG. 6(c), feedback control of the current value of a constant current element 433 is performed by average voltage detection. In (a) or (b), resistor elements are arranged in parallel in order to avoid voltage saturation. Instead, by decreasing the current value as the average voltage increases and increasing the current value as the average voltage decreases, the average voltage range may be adjusted so that the voltage drop from the termination voltage is in the range of about 150 to 350 mV.

In FIG. 6(d), a terminator is connected in series with a resistor element 442 and an inductor 443. The resistor element 442 is 50Ω, and a DC current of 5 mA specified by HDMI is supplied. The AC component is cut off by the inductor to prevent the amplitude degradation of the AC component.

In addition, since the signal amplitude is affected depending on whether the configuration of the terminator is the above-described resistor, or the constant current element, or the inductor, the receiving device 20 may determine whether to increase or decrease the reception sensitivity by notifying the receiving device 20 of the information through the CC communication channel by using the H-C conversion cable.

In addition, the terminator 131 may be constructed as 100Ω on the USB-C plug 32 side, the receiving device may be notified of this, and the terminator 231 and the like of the receiving device 20 may also have 100Ω to secure the signal amplitude. There is an advantage that the signal amplitude can be maintained while ensuring matching with the differential impedance 50Ω of the cable portion.

In addition, the power supply terminal 130 of the H-C conversion cable in FIG. 4 may be supplied with power from an external power supply, or current received as VBUS from the receiving device 20 to the output unit 160 through the terminals A4, B4, A9, and B9 (not illustrated) may be used. When power is supplied from the external power supply to the power supply terminal 130, power may be supplied to the receiving device 20 as VBUS through the terminals A4, B4, A9, and B9. As for the use of VBUS, a procedure specified by USB can also be used.

As described above, according to the present embodiment, a relay device for relaying a video includes: an input unit (120) to which a video from a transmission device is input; an output unit (160) that outputs a video to a receiving device; a DC blocking element (161 to 168) that connects pin 1 (CLK+, D2−, and the like) of the input unit and pin 2 (A10, A3, and the like) of the output unit to each other; a terminator (131 to 138) that is connected to the pin 1; a protection element (126, 127) that pulls down pin 3 (HPD, Utility) of the input unit and pin 4 (A8, B8) of the output unit; a control unit (128) to which pin 5 (CEC, SDL, SDA) of the input unit and pin 6 (A5, B5) of the output unit are connected; and pin 7 (+5V) of the input unit that is connected to the control unit. The control unit determines that the receiving device has a predetermined reception function based on information obtained from the pin 6 and, when a predetermined voltage is detected at the pin 7, separates the protection element from the pin 4 and applies a predetermined voltage to the terminator. When a standby state of the receiving device is detected from the pin 3, the control unit starts supply of termination power to the terminator to transmit video data from the pin 1 to the pin 2.

In addition, a receiving device for receiving a video includes: an input unit (210) to which a video from a relay device is input; a reception function unit (280) that receives and processes an input video; a first switch (241 to 248) that performs switching connection between pin 1 (A10, A11, and the like) of the input unit and pin 2 (CLK+, CLK−, and the like) of the reception function unit; a terminator (231 to 238) that is connected to the pin 2; a second switch (253 to 256) that performs switching and open/close connection between pin 3 (A8, B8) of the input unit and pin 4 (HPD, Utility) of the reception function unit; and a control unit (227) to which pin 5 (A5, B5) of the input unit and pin 6 (CSC, SDL, SDA) of the reception function unit are connected. The control unit applies a predetermined voltage to the terminator when it is determined that the relay device has a predetermined transmission function based on information obtained from the pin 5.

In addition, in a transmission system for transmitting a video from a transmission device to a receiving device through a relay device, each of the transmission device, the relay device, and the receiving device has a determination function for determining functions of the others, the relay device determines functions of the transmission device and the receiving device, and switches a protection element and a terminator provided at input and output terminals between valid and invalid, and the receiving device determines functions of the transmission device and the relay device and front and back of a plug and switches correspondence connection between data input terminal and a reception function unit and switches an input gain of the reception function unit.

In this manner, the HDMI video signal can be transmitted from the transmission device having an HDMI receptacle to the receiving device having a USB receptacle using the H-C conversion cable.

Embodiment 2

FIG. 7 is a block diagram in which a transmission device and a receiving device according to the present embodiment are connected to each other by a cable and a conversion dongle.

In FIG. 7, an HDMI video signal is transmitted from the transmission device 10 to the receiving device 20 using a normal HDMI cable configured to include HDMI plugs 36 and 38 and a cable 37 and an HR-CP conversion dongle 25 having an HDMI receptacle and a USB-C plug instead of the H-C conversion cable in FIG. 1.

Since the HR-CP conversion dongle 25 can be realized with the same configuration except that the input unit 120 of the H-C conversion cable in FIG. 4 is changed from a plug to a receptacle, the detailed description of the operation will be omitted.

According to the present embodiment, HDMI video signals can be transmitted from a transmission device having an HDMI receptacle to a receiving device having a USB receptacle according to various distances between the transmission device and the receiving device using normal HDMI cables having various lengths and an HR-CP conversion dongle.

Embodiment 3

FIG. 8 is a block diagram in which a transmission device and a receiving device according to the present embodiment are connected to each other by a conversion dongle and a cable.

In FIG. 8, an HDMI video signal is transmitted from the transmission device 10 to the receiving device 20 using an HP-CR conversion dongle 15 having an HDMI plug and a USB-C receptacle and a normal USB-C cable configured to include USB-C plugs 33 and 35 and a cable 34 instead of the H-C conversion cable in FIG. 1.

The HP-CR conversion dongle 15 can be realized with a similar configuration except for the terminal arrangement, that is, except that the output unit 160 of the H-C conversion cable in FIG. 4 is changed from a plug terminal to a receptacle terminal. Since the normal USB-C cable has a so-called cross cable configuration in which transmission and reception terminals are exchanged, connection between terminals is different from that in Embodiment 1. FIG. 9 illustrates terminal connections in the present embodiment.

The terminal arrangement of the HP-CR conversion dongle in FIG. 9 matches the C-H conversion cable in FIG. 2 as can be seen by comparing the broken line frame 901 in FIG. 2 and a broken line frame 903 with each other. Therefore, except for the signal exchange function based on the front and back determination regarding the plug, the USB-C receptacle terminal of the HP-CR conversion dongle in FIG. 9 and the USB-C receptacle terminal of the transmission device in FIG. 2 can be equivalent. As a result, incorrect connection can be avoided.

As described above, since the normal USB-C cable has a configuration in which the transmission terminal and the reception terminal are exchanged, the terminal arrangement of the USB-C plug on the receiving device side is the same as that illustrated in FIG. 3 in Embodiment 1. That is, the solid line frame 902 in FIG. 3 and a solid line frame 904 in FIG. 9 are arranged in the same manner. The receiving device may have the same configuration as in Embodiment 1.

According to the present embodiment, even with a configuration using an HP-CR conversion dongle and a normal USB-C cable, the same transmission device and receiving device as those in Embodiment 1 may be used. Therefore, there is an advantage that versatility is improved.

Embodiment 4

Figures 10, 11:
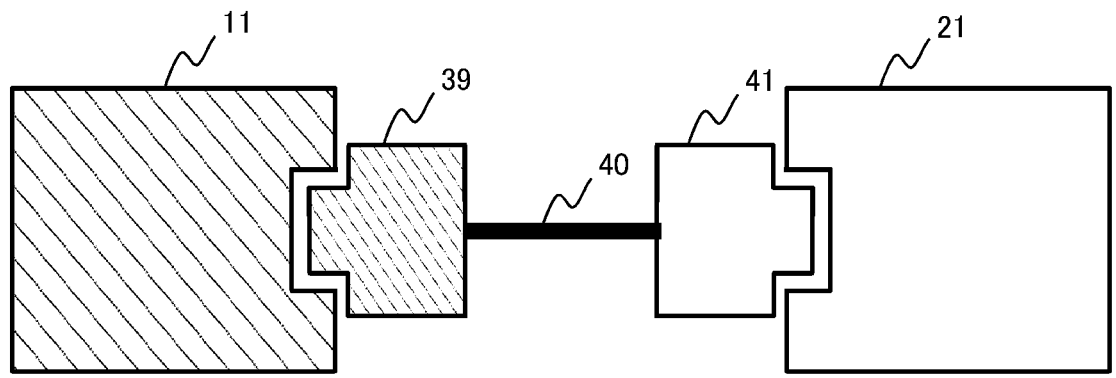
FIG. 10 is a diagram illustrating an example of connecting a transmission device and a receiving device to each other with a conversion cable in Embodiment 4.
FIG. 11 is an explanatory diagram illustrating terminal connections between a conversion cable and a receiving device according to Embodiment 4.

FIG. 10 is a block diagram in which a transmission device and a receiving device according to the present embodiment are connected to each other by a conversion cable.

In FIG. 10, transmission device 11 having a USB-C receptacle and a receiving device 21 having an HDMI receptacle are connected to each other by a C/H conversion cable configured to include a USB-C plug 39, a cable 40, and an HDMI plug 41. This connection is the same as that of the conversion cable in Non-Patent Document 1, but a function of inverting the connection direction of the conversion cable is added.

This C/H conversion cable has a feature that a function of transmitting a video signal output from the USB-C receptacle of the transmission device illustrated in FIG. 10 to the HDMI receptacle of the receiving device and a function of transmitting a video signal output from the HDMI receptacle of the transmission device illustrated in FIG. 1 to the USB-C receptacle of the receiving device can be switched. That is, if the direction is reversed, the C/H conversion cable can also be used as the H-C conversion cable described in Embodiment 1. The bidirectional connection function has an advantage that the user can use the conversion cable without checking to which direction the conversion cable corresponds.

In the connection illustrated in FIG. 10, the transmission device 11 needs to be compatible with the transmission device described in Non-Patent Document 1. Therefore, the terminal connection relationship is the terminal connection illustrated in FIG. 2 as in Non-Patent Document 1. A configuration may be adopted in which the state of use as the H-C conversion cable illustrated in FIG. 1 in Embodiment 1 is determined to switch the terminal connection illustrated in FIG. 3.

However, since it is difficult to secure the space and power for an element for switching the terminal connection in the C/H conversion cable, it is desirable not to perform signal exchange.

FIG. 11 is an explanatory diagram illustrating terminal connections between a C/H conversion cable and a receiving device with a USB-C receptacle when signals are not exchanged in the conversion cable. The broken line frame 901 in FIG. 2 and a broken line frame in FIG. 11 have the same arrangement.

Figure 12:
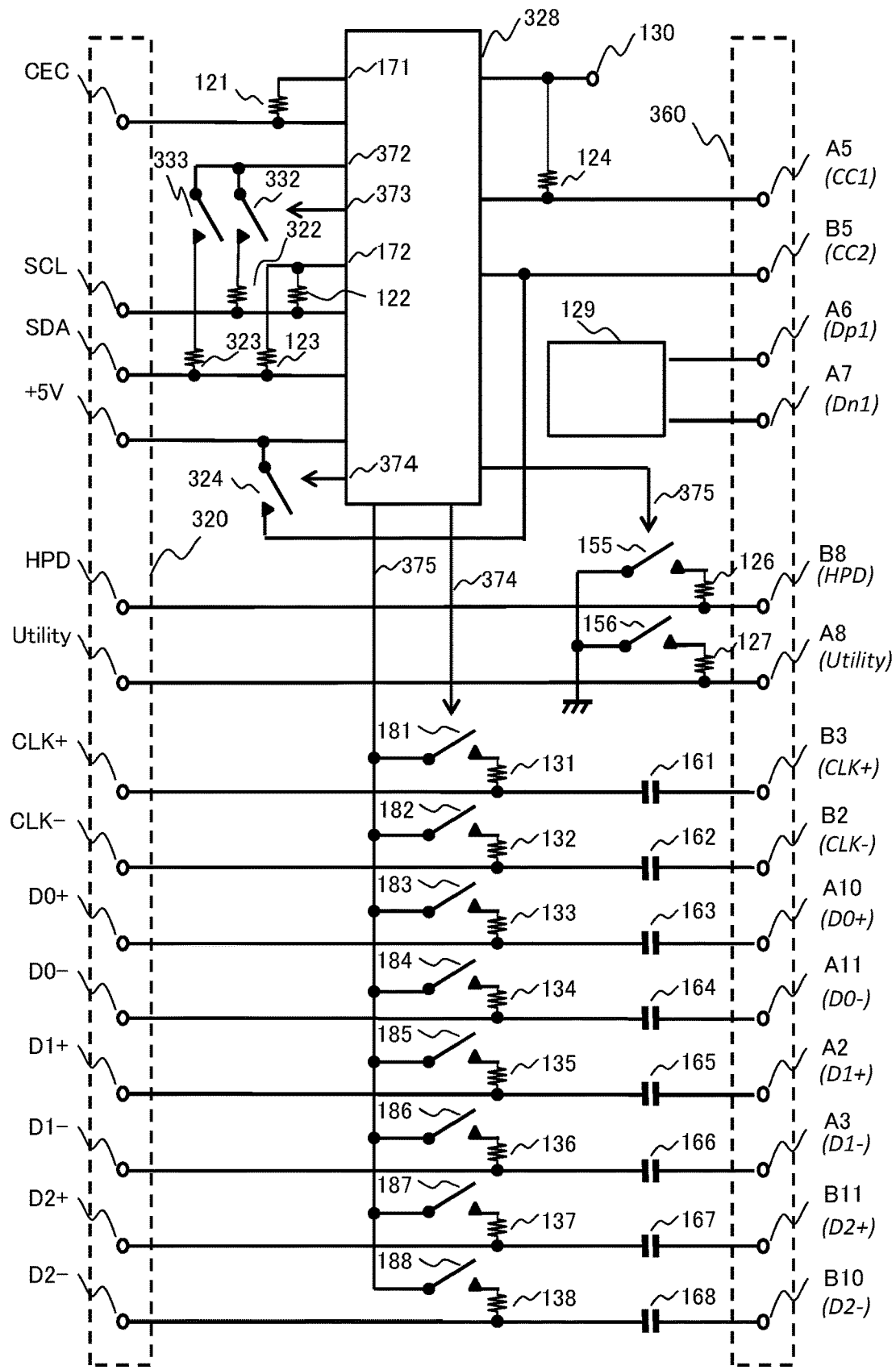
FIG. 12 is a block diagram illustrating a configuration example of a conversion cable or a conversion dongle according to Embodiment 4.

FIG. 12 is a block diagram illustrating a configuration example of the C/H conversion cable according to the present embodiment. Those having the same functions as in FIG. 4 are denoted by the same reference numerals. A terminal group 320 in an HDMI plug has terminals of CSC, SCL, SDA, +5V, HPD, Utility, CLK+, CLK−, D0+, D0−, D1+, D1−, D2+, and D2−. A terminal group 360 in a USB plug has terminals of A5, B5, A6, A7, B8, A8, B3, B2, A10, A11, A2, A3, B11, and B10. 328 is control unit, 129 is a USB2 function unit, 130 is a power supply terminal, 121, 122, 123, and 124 are pull-up elements such as resistors, 126 and 127 are protection elements such as resistors, 155, 156, and 181 to 188 are switches, 131 to 138 are terminators such as resistors, and 161 to 168 are DC blocking elements such as capacitors.

The control unit 328 acquires connection destination information through the terminals A5 and B5, and determines whether the connection destination is an HDMI transmission device having a USB-C receptacle or an HDMI receiving device. That is, in the case or the HDMI transmission device, determination as the configuration illustrated in FIG. 10 is made to make the terminal connections illustrated in FIG. 2, and the video signal is transmitted from the terminal group 360 to the terminal group 320. In the case of the HDMI receiving device, determination as the configuration illustrated in FIG. 1 is made to make the terminal connections illustrated in FIG. 11, and the video signal is transmitted from the terminal group 320 to the terminal group 360.

When it is determined that the connection destination is an HDMI transmission device having a USB-C receptacle, the transmission described in Non-Patent Document 1 may fail unless the terminators 131 to 138 are removed. Therefore, the switches 181 to 188 may be provided between a terminating power supply 375 and each of the terminators 131 to 138, so that each terminator is opened according to an instruction 374 of the control unit 328.

In addition, when it is determined that the connection destination is an HDMI transmission device having a USB-C receptacle, a switch 324 for transmitting +5V power supplied to the B5 terminal of the terminal group 360 to the +5V terminal of the terminal group 320 is provided so that the current is supplied according to the instruction 374 of the control unit 328. When it is determined that the connection destination is not the HDMI transmission device having a USB-C receptacle, the switch 324 is opened.

For example, the pull-up elements 122 and 123 of about 47 kΩ, the pull-up elements 322 and 323 of about 1.9 kΩ, and switches 332 and 333 are arranged at the SCL and SDA terminals of the terminal group 320. When it is determined that the connection destination is the HDMI transmission device with a USB-C receptacle, the switches 332 and 333 are closed by an instruction signal 373 of the control unit 328 to perform communication with the HDMI receiving device having an HDMI terminal, with about 1.8 kΩ resistance that is a parallel combined resistance value of 47 kΩ and 1.9 kΩ that are pull-up resistances of SCL and SDA. The SCL and the SDA of the control unit 328 perform i2C master operations. When it is determined that the connection destination is the HDMI receiving device having a USB-C receptacle, the switches 332 and 333 may be opened in consideration of communication with the HDMI transmission device having an HDMI receptacle. The SCL and the SDA of the control unit 328 perform i2C slave operations.

In the configuration of the receiving device illustrated in FIG. 5, the terminal arrangement may be changed from a solid line frame 912, in FIG. 3 to a broken line frame 915 in FIG. 11.

In addition, the receiving device may have a function of switching the terminal arrangement of the H-C conversion cable illustrated in FIG. 3 or the C/H conversion cable illustrated in FIG. 11 based on the information acquisition result through the A5 terminal or the B5 terminal of USB-C.

As described above, in the present embodiment, in the relay device for relaying a video, upon detecting that the second transmission device is connected to the terminal group (360) and the second receiving device is connected to the terminal group (320), video data is transmitted from the pin 2 (A10, A3, and the like) to the pin 1 (CLK+, D2−, and the like).

In addition, in the receiving device for receiving a video, the control unit (227) is configured to perform switching connection of the first switch (241 to 248) and switch the input gain of the reception function unit (280) based on the information of the front and back connection state of the relay device obtained from the pin 5 (A5, B5).

As described above, according to the present embodiment, even when the C/H conversion cable used for reverse connection, the C/H conversion cable can be operated. Therefore, there is an advantage that the time and effort for checking the transmission direction of the conversion cable are not required and the convenience of the user is improved.

Embodiment 5

FIG. 13 is a block diagram in which a transmission device and a receiving device according to the present embodiment are connected to each other by a conversion dongle and a cable.

In FIG. 13, an HDMI video signal is transmitted from the transmission device 11 to the receiving device 21 using a CP/HR conversion dongle 26 having a USB-C plug and an HDMI receptacle and a normal HDMI cable configured to include the HDMI plugs 36 and 38 and a cable 37 instead of the C/H conversion cable in FIG. 10.

The CP/HR conversion dongle 26 can be realized with a similar configuration except that the terminal group 320 in the HDMI plug of the C/H conversion cable in FIG. 12 is changed from a plug to a receptacle.

According to the present embodiment, even with configuration using a CP/HR conversion dongle and a normal HDMI cable, the same transmission device and receiving device as those in Embodiment 4 may be used. Therefore, there is an advantage that versatility is improved.

Embodiment 6

FIG. 14 is a block diagram in which a transmission device and a receiving device according to the present embodiment are connected to each other by a cable and a conversion dongle.

In FIG. 14, an HDMI video signal is transmitted from the transmission device 11 to the receiving device 21 using a normal USB-C cable configured to include the USB-C plugs 33 and 35 and the cable 34 and a CR/HP conversion dongle 16 having a USB-C receptacle and an HDMI plug instead of the C/H conversion cable in FIG. 10.

FIG. 15 is a diagram describing terminal connections of the transmission device 11, the CR/HP conversion dongle 16, the USB-C cable, and the receiving device 21 in the configuration illustrated in FIG. 14. The transmission device is the same as that in FIG. 2 but is cross-connected within the USB-C cable, so that exchange is necessary as shown by a broken line frame 906 and a solid line frame 907.

That is, in the CR/HP conversion dongle 16, in addition to changing the USB-C plug of the C/H conversion cable in FIG. 12 to a receptacle, the terminal arrangement may be changed as illustrated in FIG. 15.

According to the present embodiment, HDMI video signals can be transmitted from a transmission device having a USB-C receptacle to a receiving device having an HDMI receptacle according to various distances between the transmission device and the receiving device using normal USB-C cables having various lengths and a CR/HP conversion dongle.

Embodiment 7

Figure 16:
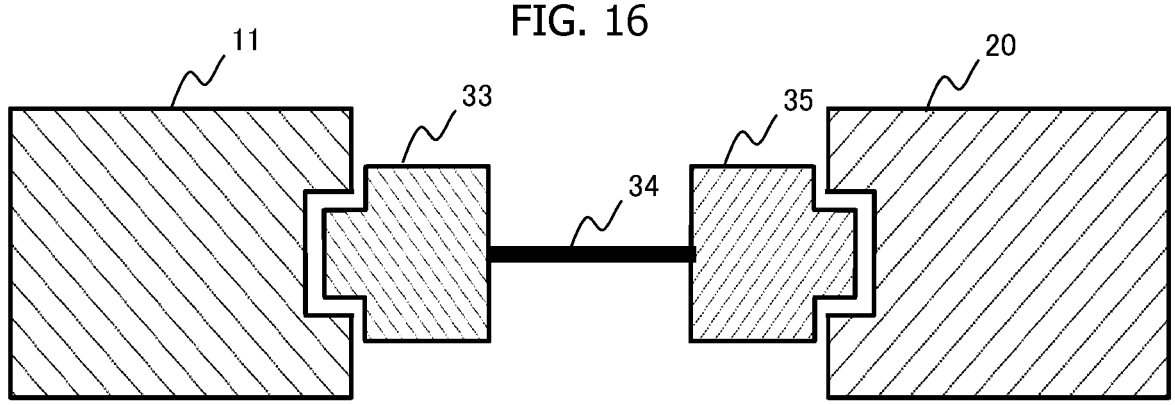
FIG. 16 is a diagram illustrating an example of connecting a transmission device and a receiving device to each other with a cable in Embodiment 7.

FIG. 16 is a block diagram in which a transmission device and a receiving device according to the present embodiment are cable-connected to each other.

In FIG. 16, video transmission from the transmission device 11 having a USB-C receptacle to the receiving device 20 having a USB-C receptacle is performed by using a normal USB-C cable that connects the USB-C plugs 33 and 35 at both ends to each other with the cable 34. The receiving device 20 corresponds to a device in which the CR/HP conversion dongle and the HDMI receiving device in Embodiment 6 are integrated.

Figure 17:
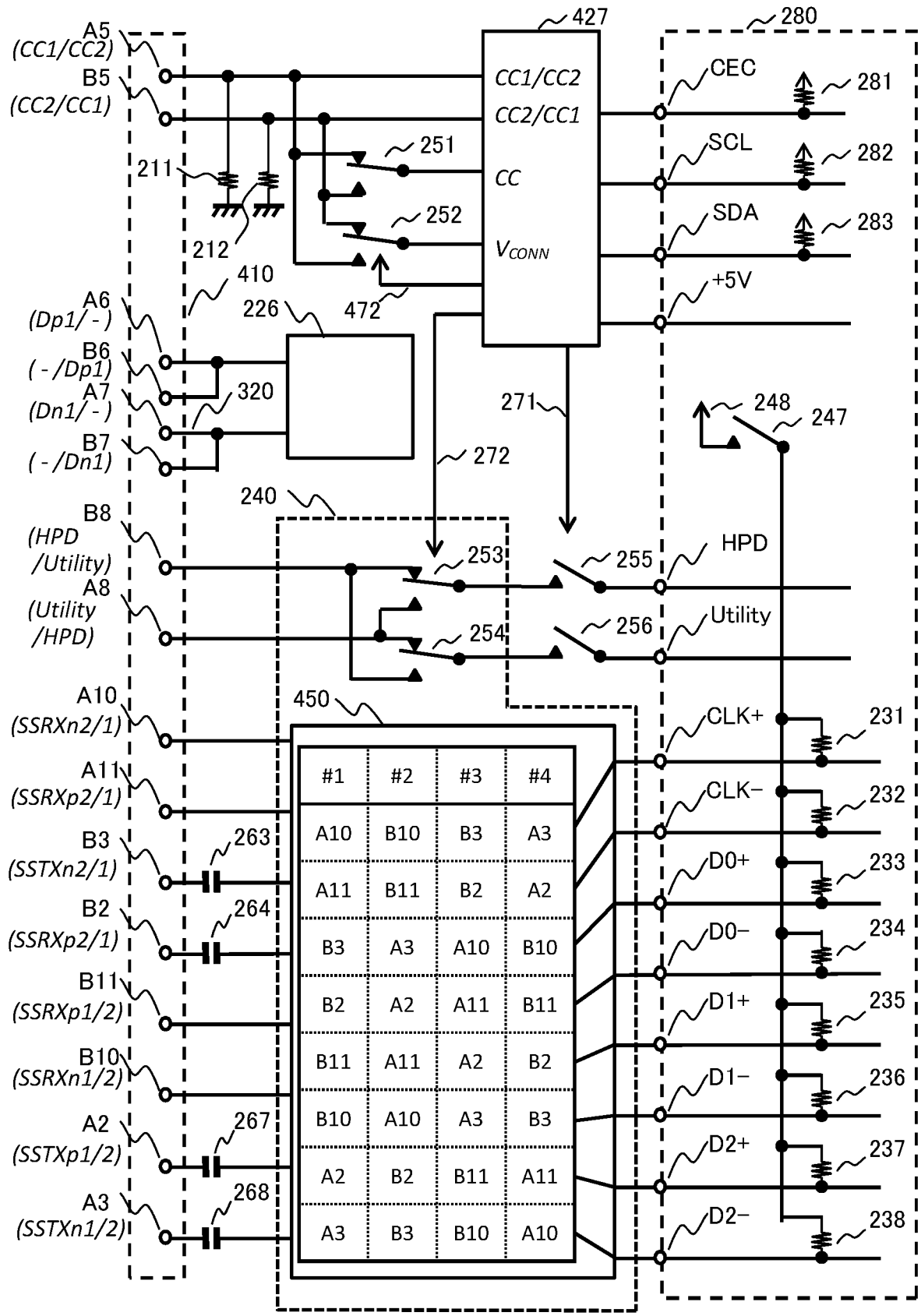
FIG. 17 is a block diagram illustrating a configuration example of the receiving device according to Embodiment 7.

Here, FIG. 17 illustrates a configuration example of a receiving device that can support any of the connection configurations of FIGS. 1, 7, and 8 described in Embodiments 1, 2, and 3 and FIG. 16 in Embodiment 7.

In FIG. 17, an input unit 410 of a USB receptacle is configured to include terminals A5, B5, A6, B6, A7, B7, B8, A8, A10, A11, B3, B2, B11, B10, A2, and A3. The configuration of the HDMI reception function unit 280 is the same as that illustrated in FIG. 5, and the description of components denoted by the same reference numerals will be omitted. 450 is a conversion matrix.

The operation of the receiving device will be described below with reference to FIG. 17. A control unit 427 illustrated in FIG. 17 is connected to terminals A5 and B5 of the input unit 410 of the USB receptacle, and establishes a communication channel according to a procedure defined in the USB Type-C specification, similarly to the control unit 227 illustrated in FIG. 5. After the communication channel is established, the operation capability information of the transmission device with a USB-C receptacle, the conversion cable, the conversion dongle, and the USB-C cable is obtained, the configurations illustrated in FIGS. 1, 7, 8, and 17 are grasped, which of the terminal connections of FIGS. 3, 9, 11, and 15 is necessary is determined, and the conversion matrix 450 is controlled.

That is, switching between #1 and #2 may be performed by front and back determination regarding plug insertion when it is determined that the terminal connections illustrated in FIG. 3 (the H-C conversion cable in FIG. 1 and the HR-CP conversion dongle in FIG. 7) and FIG. 9 (the HP-CR conversion dongle in FIG. 8) are necessary, and switching between #3 and #4 may be performed by front and back determination regarding plug insertion when it is determined that the terminal connection illustrated in FIG. 11 (the H/C conversion cable in FIG. 10) is necessary.

When the USB-C cable connection configuration illustrated in FIG. 16 is determined, since the terminal arrangement is the same as that of the CR/HP conversion dongle in FIG. 15, connection of #1 is made. Since the front and back determination regarding plug insertion is performed by the transmission device 11 with a USB-C receptacle, front and back switching of the plug in the receiving device 20 is not necessary. For the same reason, front and back switching of the plug by the switches 253 and 254 is not necessary. However, the front and back switching of the plug by the switch 251 or the switch 252 needs to be performed based on the USB-C standard.

According to the present embodiment, HDMI video signals can be transmitted from the USB-C transmission device to the USB-C receiving device through the USB-C cable.

As described above, it is possible to transmit an HDMI video signal between a device having an HDMI connector and a device having a USB-C connector using a relay device, such as a conversion cable. In addition, the conversion cable can also be used with the video transmission direction reversed. In addition, HDMI video signal transmission between devices, each of which has a USB-C connector, through a USB-C cable is possible. In addition, these devices having a USB-C connector and an HDMI reception function are also advantageous in that these can operate even in a case where not only the conversion cable and the USB-C cable but also various dongles are used.

REFERENCE SIGNS LIST 10, 11 Transmission device
15, 16, 25, 26 Conversion dongle
20, 21 Receiving device
30, 36, 38, 41 HDMI plug
32, 33, 35, 39 USB-C plug
31, 34, 37, 40 Cable
120, 210 Input unit
121, 122, 123, 124 Pull-up element
126, 127 Protection element
128 Control unit
129 USB2 function unit
130 Power supply terminal
131 to 138 Terminator
155, 156 Switch
160 Output unit
161 to 168 DC blocking element
211, 212 Pull-down element
227 Control unit
226 USB2 function unit
231 to 238 Terminator
240 Switching unit
241 to 248, 251 to 254 Selector switch
255, 256, 257 Switch
263, 264, 267, 268 DC blocking element
280 HDMI reception function unit
281, 282, 283 Pull-up element
320, 360 Terminal group

The invention claimed is:

1. A relay device for relaying a video, comprising:
an input unit to which a video from a transmission device is input;
an output unit that outputs a video to a receiving device;
a DC blocking element that connects a pin 1 of the input unit and a pin 2 of the output unit to each other;
a terminator that is connected to the pin 1;
a protection element that pulls down a pin 3 of the input unit and a pin 4 of the output unit;
a control unit to which a pin 5 of the input unit and a pin 6 of the output unit are connected; and
a pin 7 of the input unit that is connected to the control unit,
wherein the control unit determines that the receiving device has a predetermined reception function based on information obtained from the pin 6 and, when a predetermined voltage is detected at the pin 7, separates the protection element from the pin 4 and applies a predetermined voltage to the terminator, and
when a standby state of the receiving device is detected from the pin 4, the control unit starts supply of termination power to the terminator to transmit video data from the pin 1 to the pin 2.

2. The relay device according to claim 1,
wherein, upon detecting that a second transmission device is connected to the output unit and a second receiving device is connected to the input unit, video data is transmitted from the pin 2 to the pin 1.

3. A receiving device for receiving a video, comprising:
an input unit to which a video from a relay device is input;
a reception function unit that receives and processes an input video;
a first switch that performs switching connection between a pin 1 of the input unit and a pin 2 of the reception function unit;
a terminator that is connected to the pin 2;
a second switch that performs switching and open/close connection between a pin 3 of the input unit and a pin 4 of the reception function unit; and
a control unit to which a pin 5 of the input unit and a pin 6 of the reception function unit are connected,
wherein the control unit applies a predetermined voltage to the terminator when it is determined that the relay device has a predetermined transmission function based on information obtained from the pin 5.

4. The receiving device according to claim 3,
wherein the control unit performs switching connection of the first switch and switches an input gain of the reception function unit based on information of a front and back connection state of the relay device obtained from the pin 5.

5. A transmission system for transmitting a video from a transmission device to a receiving device through a relay device,
wherein the relay device detects a predetermined voltage on an input port from the transmission device and a video reception capability of the receiving device, and switches a protection element and a terminator provided at input and output terminals between valid and invalid based on the detection of the predetermined voltage and the video reception capability,
wherein the receiving device determines a front and a back of a plug based on information obtained from the relay device and switches correspondence connection between a data input terminal and a reception function unit based on the determination of the front and the back of the plug, and
wherein the receiving device detects a video transmission function of the relay device and switches an input gain of the reception function unit based on the video transmission function of the relay device.

\* \* \* \* \*